W. J. BOYNTON.
Saw-Sets.
No. 144,947. Patented Nov. 25, 1873.
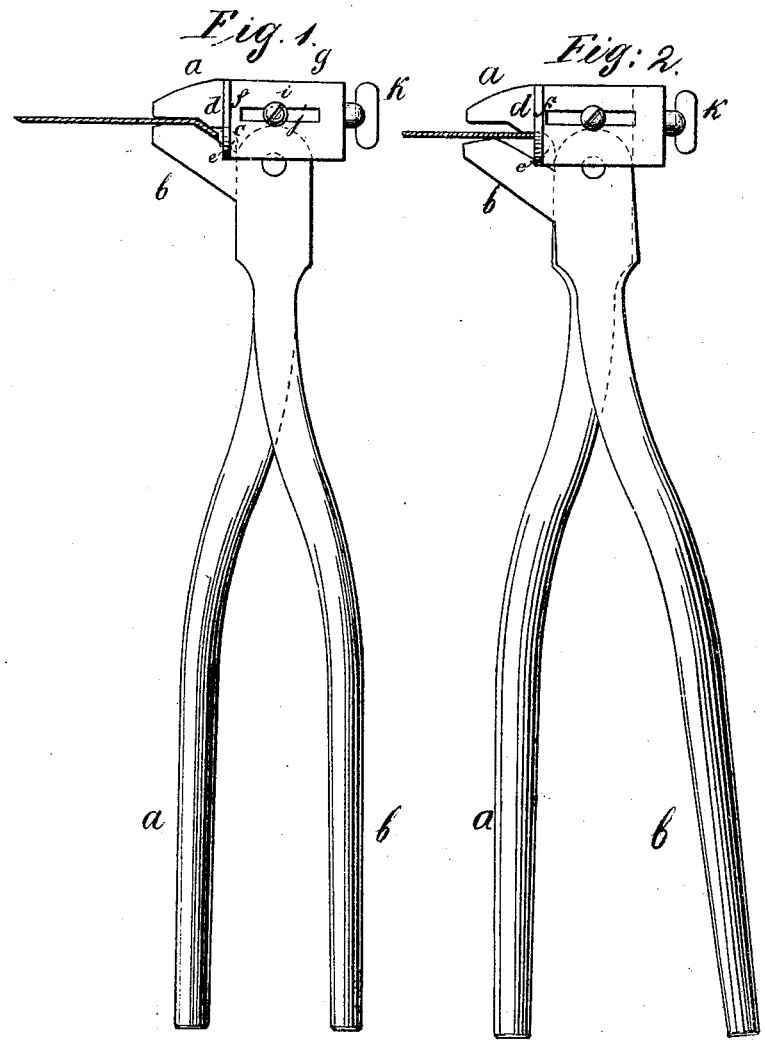

UNITED STATES PATENT OFFICE.

WILLIAM J. BOYNTON, OF BATTLE CREEK, MICHIGAN.

IMPROVEMENT IN SAW-SETS.

Specification forming part of Letters Patent No. 144,947, dated November 25, 1873; application filed October 10, 1873.

*To all whom it may concern:*

Be it known that I, WILLIAM J. BOYNTON, of Battle Creek, in the county of Calhoun and State of Michigan, have invented a new and useful Improvement in Saw-Sets; and I do hereby declare the following to be a full, clear, and exact description thereof, which will enable those skilled in the art to make and use the same, reference being had to the accompanying drawing forming part of this specification, in which drawing—

Figure 1 is a side elevation of my improvement, showing the instrument closed after operating on the tooth of a saw. Fig. 2 is a side elevation, in which the instrument is seen open. Fig. 3 is a top view of the same.

Similar letters indicate corresponding parts.

This invention consists in a saw-set intended for wide or double teeth, like the teeth of Boynton's lightning saw, as well as single teeth. The instrument is so constructed and arranged that it is not necessary to move the instrument itself to one side, after it has seized a tooth, in order to produce the set, but it is held in the same position throughout the operation, the set being produced by bringing the arms of the tool toward each other, thereby closing the jaws upon the tooth. The jaws are at right angles with the arms of the tool, and they are pivoted to each other at a suitable distance from their mouth to obtain the desired length of jaw for the saw-teeth to be set by them. The faces of the jaws are flat from the mouth or outer edge inward for a sufficient distance to give a firm grasp upon the saw-tooth, and then both decline in the direction of the center of motion of the jaws at the angle at which it is desired to set the saw. The inclined portion of the upper jaw is not continued as far inward as the lower jaw, but is cut away to form a cavity or throat, into which the point of the saw-tooth projects, so that the extreme point or points of the tooth are not directly subjected to the pressure or contact of the upper jaw, the pressure being made nearer the base of the tooth by the inclined portion of said jaw. This construction of the upper jaw enables me to avoid the endwise action or push against the point of the tooth or teeth which would take place if the inner inclined part of the upper jaw were left solid throughout its whole extent.

The letter $a$ designates the upper jaw and its handle, and $b$ the lower jaw and handle. The faces of the jaws are straight from their mouth inward a little distance to the point $x$, so as to afford a good grasp upon the saw, and upon the heel or part of the tooth which is not to be bent. From the point $x$, the faces of both jaws are inclined downward in the direction of the axis or center of motion of the jaws, the inclination being such, with respect to the front part of their faces, as shall correspond to the set to be given to the saw. The inclined face $c$ of the under jaw is continued to the inner end of that jaw; but the inclined face $d$ of the upper jaw is continued through only a part of its length, its inner portion being cut away to form, when the jaws are closed, a throat or cavity, $e$, in which the point of the tooth, or teeth, where a double-toothed saw is operated upon, can lie without being pushed against in an outward direction, or endwise, as would be the case if the heel of the upper jaw were left solid down to its joint. In closing the jaws upon the saw tooth or teeth, the angle $f$ of the upper jaw comes down upon the tooth above its point and gripes it firmly, so that it cannot slip back, the end of the tooth being bent by the closing of the jaws to conform to the inclination of the lower jaw, upon which the tooth is forced down. By this means the teeth are set without forcing the saw back from the gage, and consequently great uniformity in the set is secured. The gage $g$ consists of a plate formed so as to embrace the back and sides of the jaws, its ends $h\ h$ being bent at right angles to and extending out from the sides of the jaws, so as to form a gage on each side. The gage is connected to the sides of the instrument by means of pins $i\ i$, that project from the sides of the instrument and enter horizontal slots $j\ j$ made in the sides of the gage; and the gage is adjusted by means of a thumb-screw, $k$, which passes through the back of the gage, to which it is connected by a pin, $l$, so that it can turn in the gage, the end of the screw working in a tappet-hole in the back of the instrument in such a manner that by screwing it in the gage is moved forward, and vice versa.

My improvement is adapted for general use, and enables one to dispense with a screw-driver in setting the gage, as well as to dispense with other tools in the ordinary use of the instrument, so that any one needing to set his saw while in the forest or field, away from mechanical appliances, can, by means of the thumb-screw, adjust the gage with ease.

What I claim as new, and desire to secure by Letters Patent, is—

A saw-set combining in its construction two jaws, having a throat, $e$, to receive the extreme end of the saw-tooth to relieve it of pressure, two inclined faces for bending the tooth, and two flat surfaces for grasping and holding the saw-blades, arranged to operate substantially as herein shown and described, for the purpose specified.

WILLIAM J. BOYNTON.

Witnesses:
FRED. M. WADLEIGH,
C. C. PEAVEY.